United States Patent [19]

Blaszuk

[11] Patent Number: 5,189,681
[45] Date of Patent: Feb. 23, 1993

[54] HIGH POWERED LASER WITH REDUCED OPTICAL ABERRATION

[75] Inventor: Paul R. Blaszuk, Lebanon, Conn.

[73] Assignee: United Technologies Corporation, Hartford, Conn.

[21] Appl. No.: 781,771

[22] Filed: Oct. 23, 1991

[51] Int. Cl.⁵ .............................................. H01S 3/08
[52] U.S. Cl. ...................................................... 372/95
[58] Field of Search ............................. 372/95, 99, 101

[56] References Cited

U.S. PATENT DOCUMENTS 4,903,271  2/1990  Yasui et al. ............................ 372/95
5,125,001  6/1992  Yagi et al. ............................. 372/95

OTHER PUBLICATIONS

David D. Smith, High-Power Laser Propagation: Thermal Blooming, Proceedings of the IEEE, vol. 65, No. 12, Dec. 1977.

Primary Examiner—John D. Lee
Assistant Examiner—Robert E. Wise
Attorney, Agent, or Firm—McCormick, Paulding & Huber

[57] ABSTRACT

A high power convective flow gas laser having reduced aberration is characterized by negative branch unstable resonator configuration. The present laser is configured to invert an intracavity beam about a focal point within the optical cavity, thereby avoiding a region of high temperature gas located adjacent to the excitation cathode. The present laser has an output beam whose profile corresponds to the theoretical annular shape and is further characterized by an extraction efficiency on par with those of known lasers.

12 Claims, 3 Drawing Sheets

HIGH POWERED LASER WITH REDUCED OPTICAL ABERRATION

TECHNICAL FIELD

The present invention relates generally towards lasers and more particularly towards high powered lasers having an unstable resonator configuration.

CROSS REFERENCE TO RELATED APPLICATIONS

Some of the subject matter hereof is disclosed and claimed in the following commonly owned, copending U.S. patent applications which are incorporated herein by reference: "A High Power Laser Having Staged Laser Adjoint Pulsed Feedback"—"Optically Pulsed Laser Having Coupled Adjoint Beams"—"A Modelocked High Power Laser Having An Adjoint Feedback Beam"—"Pulsed Ring Lasers Using Adjoint Coupling Control"—"Optically Pulsed Laser"—"Linear Polarization Control of High Power Lasers"—"Improved Linear Polarization Control of High Power Lasers"—and "Circular and Elliptical Polarization of a High Power Laser by Adjoint Feedback"—

BACKGROUND OF THE INVENTION

High powered lasers used for welding or drilling are well known in the art. Typically, these lasers, such as the high powered (14 kilowatt) CW laser marketed by the Industrial Laser Division of United Technologies Corporation, are of the transverse electrode convective flow type. In these lasers, a gaseous lasing medium are flowed through a region of opposed electrodes. A gas discharge is created between the electrodes, creating the population inversion that is needed to generate a high powered, coherent discharge.

While these high powered convective flow lasers may have a variety of optical configurations, many of the most successful ones marketed currently are characterized by a confocal unstable resonator optical geometry. This resonator geometry is characterized by an output beam whose beam profile is, in theory, annular. However, the known lasers of the above type are characterized by an asymmetry in the beam profile produced as a result of an index change in the gas. The high powers associated with these devices create a region usually near the cathode which is at a substantially higher temperature than that of the remainder of the lasing medium. The higher temperature region is characterized by a different index of refraction, yielding an output beam with a truncated profile. Efforts to correct for this phenomenon have centered on trying to minimize or eliminate the region of higher temperature and have met with limited success.

It would be advantageous to have a high powered laser of the aforementioned type characterized by a symmetric output beam profile. The present invention is drawn towards such a laser.

SUMMARY OF THE INVENTION

An object of the present invention is to provide a laser whose output beam is characterized by a symmetric output beam profile.

Another object of the present invention is to provide a high powered laser of the foregoing type having a negative branch unstable resonator configuration characterized by high extraction efficiencies.

Another object of the present invention is to provide a laser of the foregoing type wherein any optical distortion that is introduced by interaction with gaseous gain medium is symmetric about the output beam profile.

Another object of the present invention is to provide a laser of the foregoing type having an intracavity focal point providing for beam inversion averaging any streamwise asymmetries in the gaseous medium flow direction.

According to the present invention, an unstable optical resonator assembly for use with a laser having an optical cavity with a gaseous gain medium located therein, the gaseous gain medium having opposed electrical excitation electrodes adjacent to the optical cavity extending along a portion of an optic axis, the gaseous gain medium having a first region at a first temperature and a second region adjacent to one of the electrodes at a second temperature, the unstable optical resonator assembly includes a first mirror positioned at a first end of the optical cavity having a focus therein located along the optic axis. A second mirror is positioned opposed to the first mirror at a second end of the optical cavity and has a focus therein substantially at the first mirror focus. The first and second mirrors are configured to invert an optical beam transiting therebetween; thereby having the optical beam substantially avoid the second gaseous gain medium region.

According to another aspect of the present invention, a laser includes an optical cavity with opposed electrical excitation electrodes adjacent to the optical cavity extending along a portion of an optic axis. A gaseous gain medium is located in the optical cavity and has a first region at a first temperature and a second region adjacent to one of the electrodes at a second temperature. Also included is an unstable optical resonator assembly positioned within the optical cavity that has a first mirror positioned at a first end of the optical cavity that has a focus therein located along the optic axis. A second mirror is positioned opposed to the first mirror at a second end of the optical cavity. The second mirror has a focus within the optical cavity substantially at the first mirror focus. The first and second mirrors are configured to invert an optical beam transiting therebetween, thereby having the optical beam substantially avoid the second gaseous gain medium region.

DESCRIPTION OF THE PREFERRED EMBODIMENT

Figure 1:
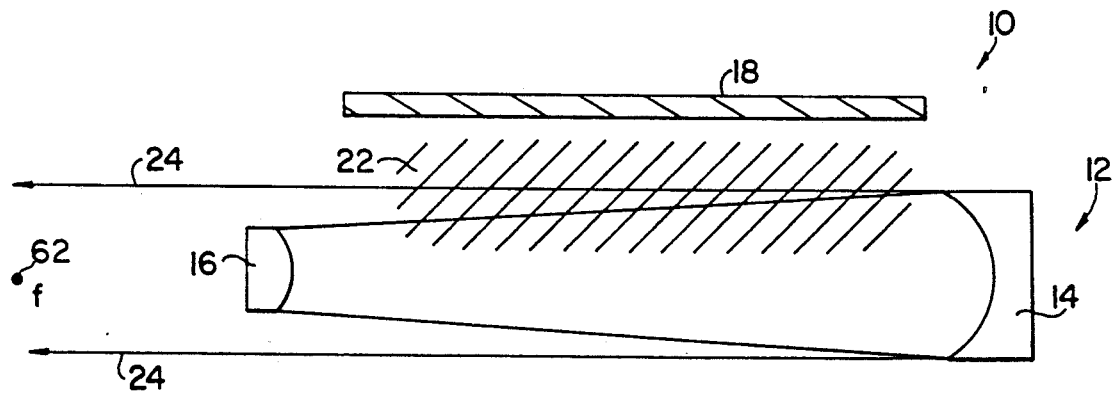
FIG. 1 is a simplified schematic illustration showing in section a high powered laser having a prior art positive branch confocal unstable resonator geometry.

Referring now to FIG. 1, there is illustrated a portion of a high powered convective flow $CO_2$ laser of the type marketed by the Industrial Laser Division of United Technologies Corporation and other vendors. The laser 10 has an optical cavity 12 characterized by mirrors 14 and 16 having optical characteristics configured to produce a confocal resonator geometry of the positive branch type. This resonator geometry is well known in the art and has been used by a variety of vendors to produce high power, in excess of 1000 watts. A $CO_2$ laser using this configuration has electrodes 18 and 20 which are shown schematically placed above and below the optical cavity. In a typical high powered $CO_2$ laser, large volumes of active gas are flowed at very high velocities (approximately 0.3 Mach) through the laser cavity in a direction into the plane of FIG. 1.

Figure 2:
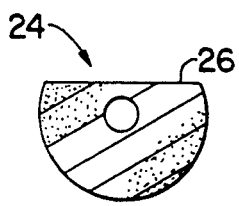
FIG. 2 is a simplified cross section of a prior art output beam.

Naturally, the reactant species are heated, especially at the area 22 closest to the cathode which forms a thermal plume. The heating of the gas results in a change in temperature, and with it a corresponding change in the index of refraction of that part of the gas closes to the cathode 18. As a result, the output beam schematically illustrated at 24 in FIG. 2 is not of a preferred annular shape, but rather has an upper portion 26 which is truncated. The beam quality (focusability) of this design is degraded at high power by the thermal plume which typically forms around the cathode. This region of hotter gas causes distortion of the beam by the familiar mechanism of thermal blooming and bending (see the note by D. C. Smith, Proceedings of the IEEE Vol. 65, No. 12, Dec. 1977).

Figure 3:
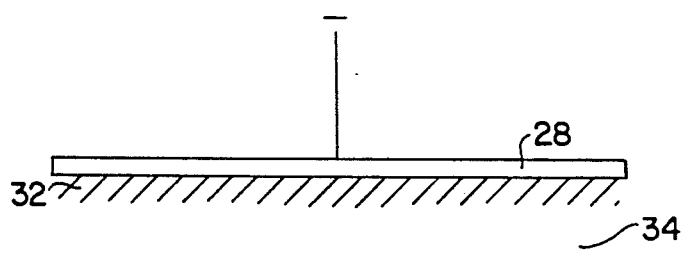
FIG. 3 is a diagram, in section, of a portion of the laser of FIG. 2 illustrating the glow discharge characteristics.
Figure 3:
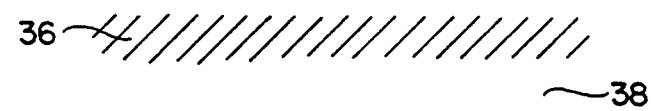

As shown in FIG. 3, a glow discharge can be produced when a DC voltage is applied between two spaced electrodes with low or high pressure gas therebetween. The physics which govern glow discharges is well known and can be seen by way of reference to any of a number of texts, including the "Handbook of Thin Film Technology" by L. I. Maissel and R. Glang. An electric field is generated across the electrodes (cathode 28 and anode 30). The glow discharge itself is comprised of a cathode glow 32, Crookes dark space 34, negative glow 36, Faraday dark space 38 and the positive column 40. It is the plasma in the cathode glow which receives the most heat and therefore experiences the greatest rise in temperature.

Figure 4:
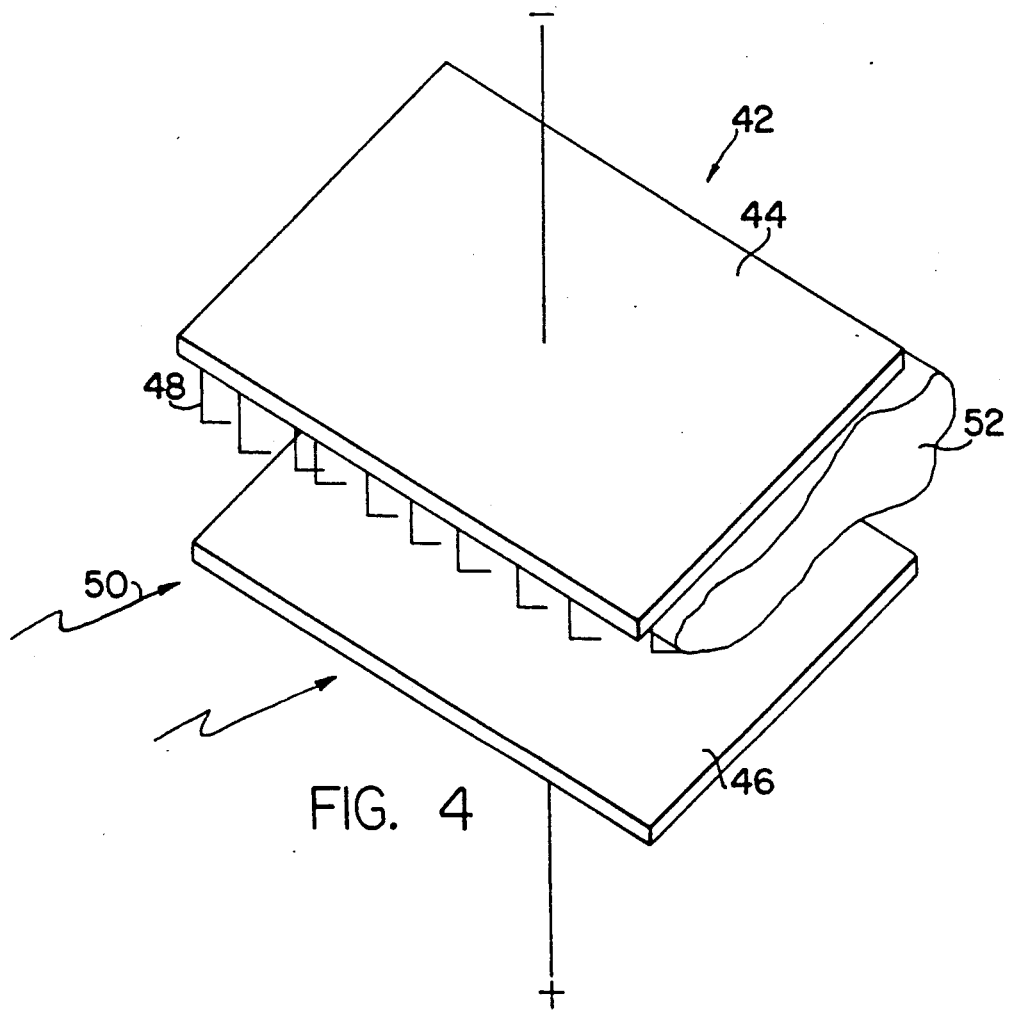
FIG. 4 is a simplified schematic illustration in perspective of the electrode geometry of a laser provided according to the present invention.

FIG. 4, illustrates a portion of a laser 42 provided in accordance with the present invention. Electrodes 44 and 46 are of the type detailed above, with the cathode 44 further enhanced by a plurality of spaced L-shaped electrodes 48 of a type known in the art. The carbon dioxide lasing medium 50 is flowed at high velocity between the electrodes. As a result of the discharge, a plume 52 of hot gas extends from the cathode and is replenished by the flow of gas.

Figure 6:
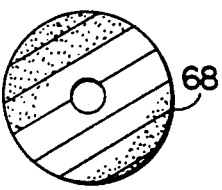
FIG. 6 is a simplified cross section of an output beam generated by the laser of FIG. 4.
Figure 5:
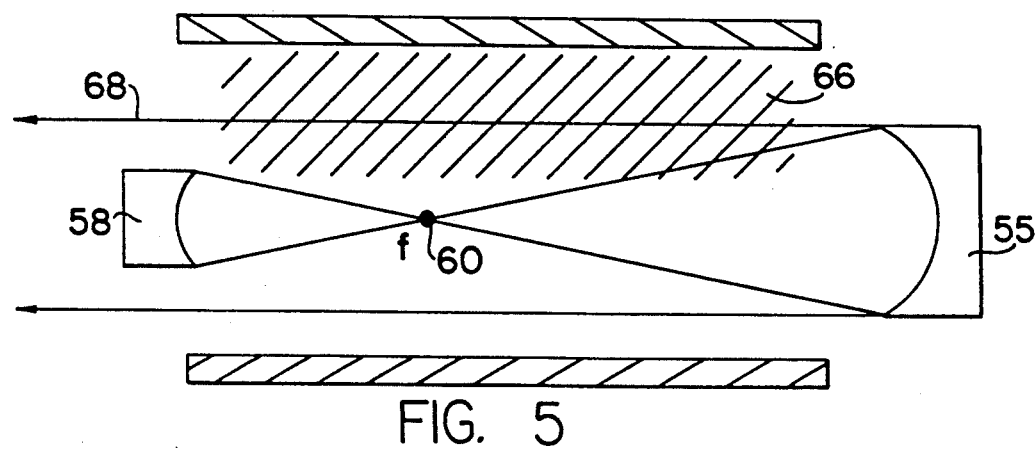
FIG. 5 is a simplified schematic illustration, in section, of a portion of the laser of FIG. 4.

While efforts have been made to eliminate or otherwise diminish the extent of the thermal plume created using this electrode geometry, an important aspect of the present invention overcomes the aforementioned problems by moving the beam away from the effected region. As seen by way of reference to FIG. 5, the present laser employs a confocal unstable resonator assembly of the negative branch type. The resonator assembly is comprised of mirrors 55 and 58 whose foci (f) 60 substantially coincide and are located within the cavity. This geometry stands in contrast to the positive branch resonator geometry of FIG. 1 whose foci F 62 coincide at a point located outside the optical cavity beyond the mirrors. Region 66 of the cathode fall contains the high temperature gas. Laser beam 68 is seen to be substantially displaced from the region 66 as it passes between the mirrors. This results in an output beam whose profile shown in FIG. 6 is substantially the same as the preferred annular beam profile.

A comparison of the two resonator geometries reveals the negative branch resonator geometry of the present invention to have less beam path in the region of distorted media. Moreover, it is important to note that the intracavity foci results in an exchange of the top and bottom portions of the beam as it passes through the foci so that any distortion that is introduced thereto tends to be more symmetric than the positive branch resonator where it is all the top of the beam introducing both tilt and coma. The inversion at the focal point will also average any streamwise asymmetries in the flow direction.

Figure 7:
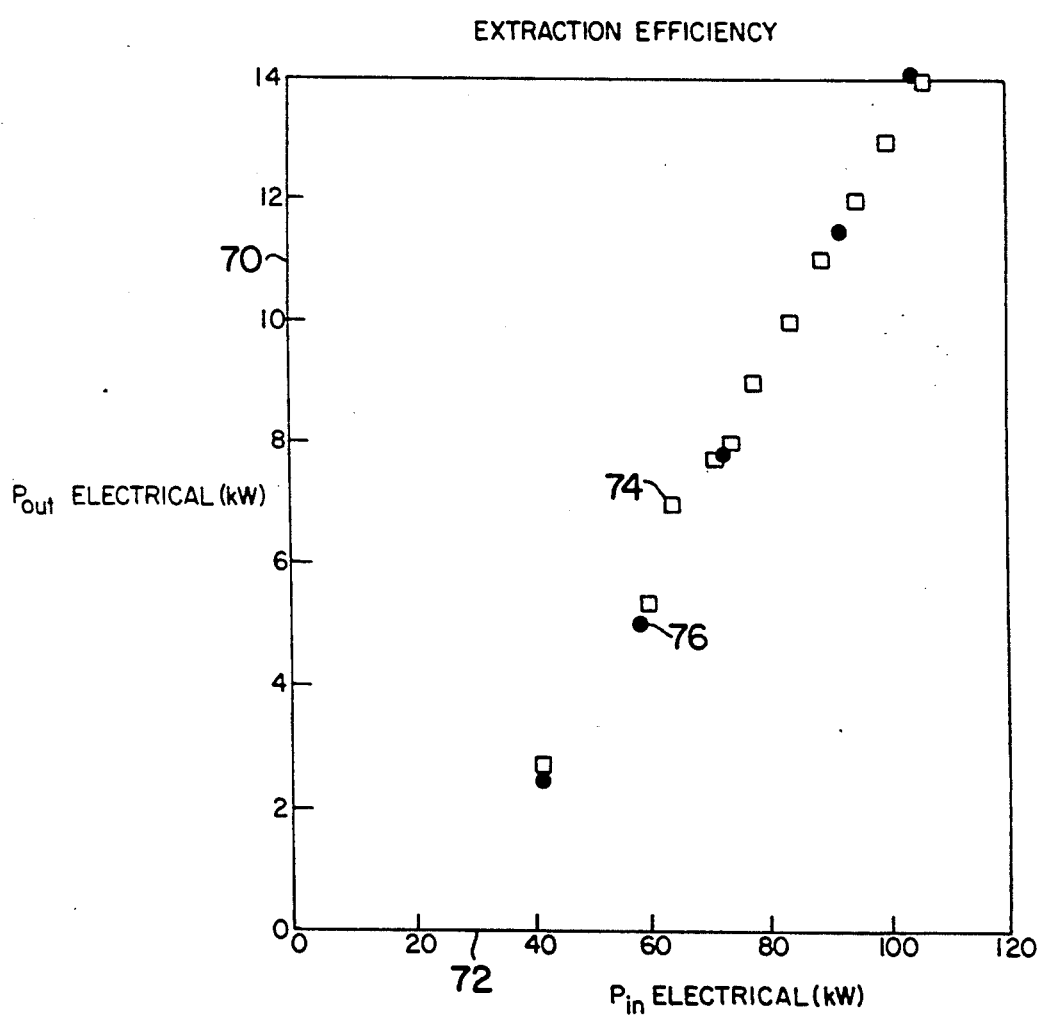
FIG. 7 is a diagrammatic illustration showing extraction efficiencies between the lasers of FIGS. 1 and 4.

The extraction efficiency of a laser produced in accordance with the present invention (negative branch resonator geometry) as compared to a known laser (positive branch resonator geometry) is set forth at FIG. 7. Axis 70 corresponds to power out as measured in kilowatts while axis 72 corresponds to the input power in kilowatts. Square boxes 74 correspond to the measured output power of a laser provided in accordance with the present invention, while solid circles 76 correspond to the measured output power of a laser having positive confocal unstable resonator geometry. The extraction efficiencies correspond to the slope of the respective lines along which the data line are approximately equal.

Measurements of the focusability and welding performance of a laser provided in accordance with the present invention indicate a 15% to 20% increase in the speed and/or penetration over the prior art positive branch lasers operating at the same output power. Measurements conducted between known lasers having the positive branch unstable resonator geometry as compared to one provided according to the present invention, indicate that the present laser provides superior welding performance. At 6 kilowatts, a prior art positive branch laser welds at 60 inches per minute (IPM) in quarter inch cold rolled steel, while a laser constructed in accordance with the present invention welds ninety inches per minute in the same material. At 10 kilowatts of optical power, a speed of 130 inches per minute will be reached with the present laser, while the prior art laser yields only 110 IPM.

Those skilled in the art will note that the present resonator assembly can be retrofitted into any appropriate existing laser. Note that a laser made in accordance with the present invention keeps the intracavity beam focused away from any mirror surface and avoids possibility of damage thereto. Those skilled in the art will also note that the optical advantages provided by the present invention can also be suggested in terms of the optical laser aberration function. For those lasers having a positive branch unstable resonator geometry, coefficients of the Zernike polynomials in the coefficient expansion can have a non-zero value. However, for a laser provided in accordance with the present invention, the intracavity inversion of the beam about the focal point forces all of the odd expansion coefficiencies to be zero.

Similarly, although the invention has been shown and described with respect to a preferred embodiment thereof, it should be understood by those skilled in the art that various other changes, omissions and additions thereto may be made therein without departing from he spirit and scope of the present invention.

I claim:

1. An unstable optical resonator assembly for use with a laser having an optical cavity with a gaseous gain medium located therein, said gaseous gain medium having opposed electrical excitation electrodes adjacent to said optical cavity extending along a portion of an optic axis, said gaseous gain medium having a first region at a first temperature and a second region adjacent to one of said electrodes at a second temperature, said unstable optical resonator assembly comprising:
   a first mirror positioned at a first end of the optical cavity having a focus therein located along said optic axis;
   a second mirror positioned opposed to said first mirror at a second end of the optical cavity, said second mirror having a focus therein substantially at said first mirror focus;
   said first and second mirrors configured to invert an optical beam transiting therebetween thereby having said optical beam substantially avoid said second gaseous gain medium region.

2. The resonator assembly of claim 1 wherein said gaseous gain medium comprises one or more of the gases from the group consisting essentially of carbon dioxide, nitrogen, and helium.

3. The resonator assembly of claim 2 wherein said laser is of the transverse electrode convective flow type and wherein said second gain medium region comprises a region extending from a cathode electrode.

4. The resonator assembly of claim 3 wherein said cathode electrode further comprises a series of "L" shaped elements extending into said gaseous gain medium.

5. The resonator assembly of claim 2 wherein said gaseous gain medium is flowed between said electrodes at a velocity of approximately Mach 0.3.

6. The resonator assembly of claim 1 wherein said optical beam transits through a portion of said second gaseous gain medium region and is partially distorted thereby in a first optical beam segment and wherein said distorted first optical beam segment is inverted through said mirror focus such that said distorted first optical beam segment extends symmetrically about said optical beam.

7. A laser, comprising:
   an optical cavity;
   opposed electrical excitation electrodes adjacent to said optical cavity extending along a portion of an optic axis;
   a gaseous gain medium located in said optical cavity having a first region at a first temperature and a second region adjacent to one of said electrodes at a second temperature; and
   an unstable optical resonator assembly positioned within said optical cavity including
   a first mirror positioned at a first end of the optical cavity having a focus therein located along said optic axis; and
   a second mirror positioned opposed to said first mirror at a second end of the optical cavity, said second mirror having a focus therein substantially at said first mirror focus;
   said first and second mirrors configured to invert an optical beam transiting therebetween thereby having said optical beam substantially avoid said second gaseous gain medium region.

8. The laser of claim 7 wherein said gaseous gain medium comprises one or more of the gases from the group consisting essentially of carbon dioxide, nitrogen and helium.

9. The laser of claim 8 wherein said laser is of the transverse electrode convective flow type and wherein said second gain medium region comprises a region extending from a cathode electrode.

10. The laser assembly of claim 9 wherein said cathode electrode further comprises a series of "L" shaped elements extending into said gaseous gain medium.

11. The laser of claim 8 wherein said gaseous gain medium gas is flowed between said electrodes at a velocity of approximately Mach 0.3.

12. The laser of claim 7 wherein said optical beam transits through a portion of said second gaseous gain medium region and is partially distorted thereby in a first optical beam segment and wherein said distorted first optical beam segment is inverted through said mirror focus such that said distorted first optical beam segment extends symmetrically about said optical beam.

* * * * *